United States Patent
Barkey et al.

[11] Patent Number: 5,968,179
[45] Date of Patent: *Oct. 19, 1999

[54] METHOD FOR INITIALIZING A SELF-TIMED LINK

[75] Inventors: Kathy Sue Barkey; Derrick LeRoy Garmire, both of Kingston, N.Y.; Harold Edgar Roman, Danville, N.H.; Daniel Gerard Smyth, Austin, Tex.

[73] Assignee: International Business Machines Corporation, Armonk, N.Y.

[ * ] Notice: This patent is subject to a terminal disclaimer.

[21] Appl. No.: 08/841,977

[22] Filed: Apr. 8, 1997

[51] Int. Cl.$^6$ ........................................ G06F 1/04
[52] U.S. Cl. ............................................... 713/400
[58] Field of Search ............... 395/185.06, 555, 395/299, 200.67; 370/235; 364/132, 269; 340/825.5; 714/53; 713/500; 710/119

[56] References Cited

U.S. PATENT DOCUMENTS

| | | |
|---|---|---|
| 5,140,680 | 8/1992 | Best ........................................ 395/325 |
| 5,237,696 | 8/1993 | Best ........................................ 395/725 |
| 5,249,188 | 9/1993 | McDonald .............................. 371/68.3 |
| 5,453,982 | 9/1995 | Pennington et al. ................... 370/85.1 |
| 5,513,377 | 4/1996 | Capowski et al. ...................... 395/881 |
| 5,522,088 | 5/1996 | Halma et al. ........................... 395/881 |
| 5,553,276 | 9/1996 | Dean ....................................... 395/550 |
| 5,634,004 | 5/1997 | Gopinath et al. .................. 395/200.02 |
| 5,694,612 | 12/1997 | Garmire et al. ........................ 395/800 |
| 5,710,910 | 1/1998 | Kehl et al. .............................. 395/551 |
| 5,825,748 | 4/1997 | Barkey et al. .......................... 370/236 |

*Primary Examiner*—Joseph E. Palys
*Assistant Examiner*—Omar A. Omar
*Attorney, Agent, or Firm*—Floyd A. Gonzalez, Esq.; Heslin & Rothenberg, P.C.

[57] ABSTRACT

A self-timed link between two elements in a computer system is initialized. Each element sends an initialization request to the other. If successfully received, the elements exchange signals with oscillation-free segments over multiple clock cycles. If successful, the elements indicate to each other that initialization is complete. Optionally, a link operation parameter can be sent with the initialization complete indication for post-initialization link control.

34 Claims, 6 Drawing Sheets

METHOD FOR INITIALIZING A SELF-TIMED LINK

BACKGROUND OF THE INVENTION

1. Technical Field

The present invention generally relates to initializing a link in a computer system. More particularly, the present invention relates to initializing a self-timed link between two elements in a computer system.

2. Background Information

Given a system in which the only means of communication between two elements is a self-timed link, before the link can be used, it must be initialized. However, because of the nature of the link, the initialization must be accomplished without relying on clean data transitions. A general description of a self-timed link can be found in two U.S. patents: U.S. Pat. No. 5,513,377, issued to Capowski et al. on Apr. 30, 1996, and entitled "Input-Output Element has Self Timed Interface Using a Received Clock Signal to Individually Phase Aligned Bits Received From a Parallel Bus"; and U.S. Pat. No. 5,522,088, issued to Halma et al. on May 28, 1996, and entitled "Shared Channel Subsystem has a Self Timed Interface Using a Received Clock Signal to Individually Phase Align Bits Received From a Parallel Bus". Both of these patents are herein incorporated by reference in their entirety.

Thus, a need exists for a way to initialize a self-timed link.

SUMMARY OF THE INVENTION

Briefly, the present invention satisfies the need for a way to initialize a self-timed link by providing a protocol that takes into account the unreliable data patterns produced before initialization.

In accordance with the above, it is an object of the present invention to provide a way initialize a self-timed link in a data processing system.

It is a further object of the present invention to provide a way to initialize a self-timed link between two elements in a data processing system that involves the elements communicating with each other.

The present invention provides a method for initializing a self-timed link between a first element and a second element in a data processing system wherein the first element determines whether the second element is ready to begin initializing the link, and the second element determines whether the first element is ready to begin initializing the link.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
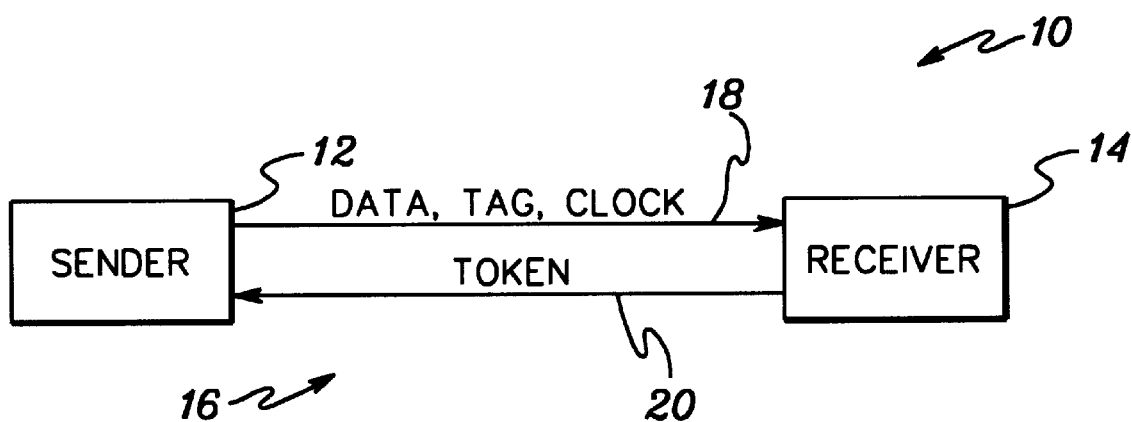
FIG. 1 is a simplified block diagram of a synchronization unit according to the present invention.

FIG. 1 is a simplified block diagram of a synchronization unit 10 according to the present invention. Synchronization unit 10 comprises a sender element 12 and a receiver element 14, connected by a self-timed link 16, comprising lines 18 and 20. Data, tag and clock signals are sent from sender 12 to receiver 14 over line 18. A receiver synchronization complete code is sent from receiver 14 to sender 12 over line 20. It will be understood, however, that line 18 actually comprises multiple lines. As one skilled in the art will know, a tag line carries control information that qualifies the contents of the data line(s).

Figure 2:
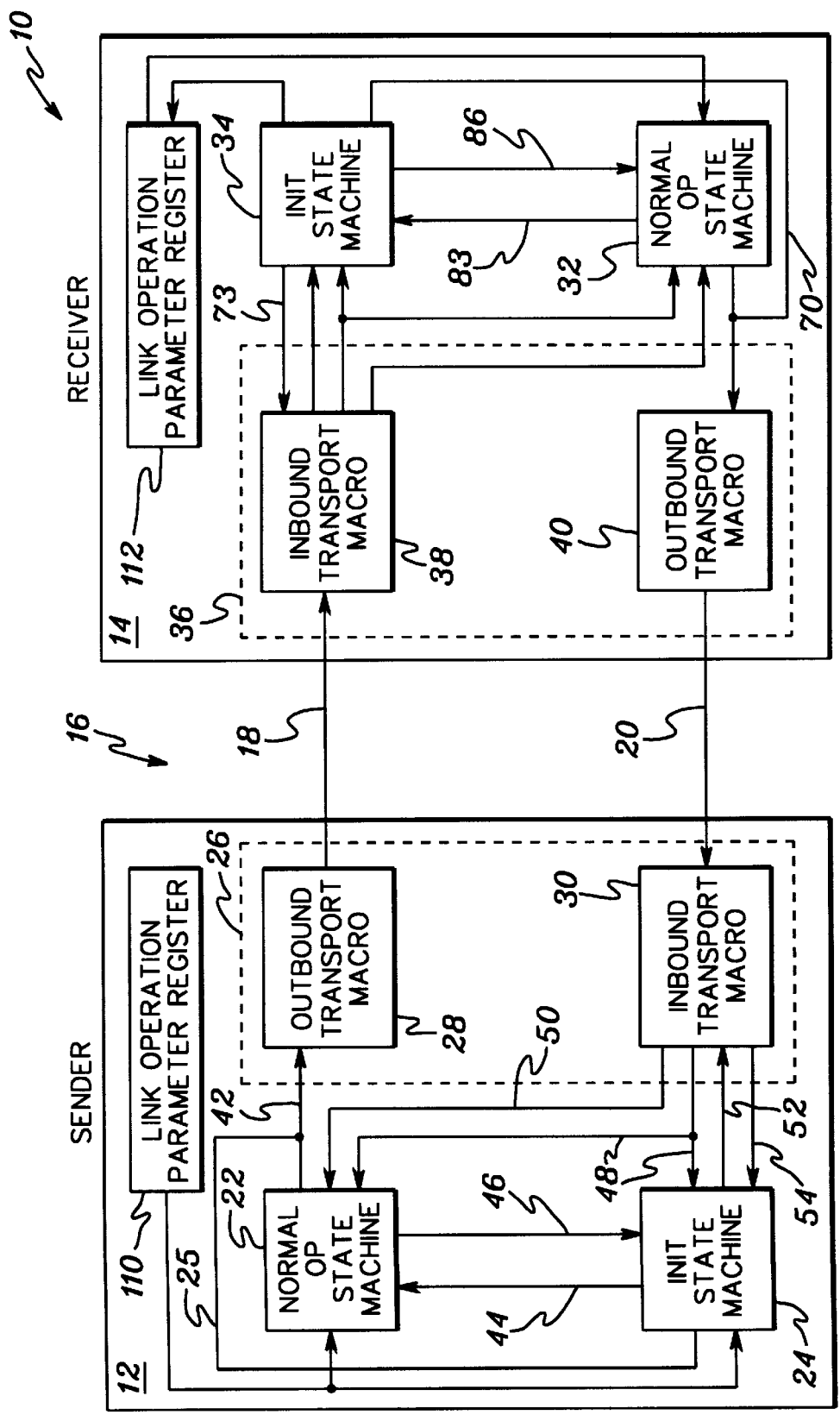
FIG. 2 is a more detailed block diagram of the synchronization unit of FIG. 1.

FIG. 2 is a more detailed block diagram of synchronization unit 10 from FIG. 1. As shown in FIG. 2, sender 12 comprises a normal operation state machine 22, initialization state machine 24, and a link transport macro 26 comprising an outbound transport macro 28, and an inbound transport macro 30. Similarly, receiver element 14 comprises a normal operation state machine 32, an initialization state machine 34, and a link transport macro 36 comprising an outbound transport macro 40 and an inbound transport macro 38. As used herein, the term "state machine" refers to a logic function using present state and logic inputs to determine next state and logic outputs. The inbound and outbound transport macros are similar to the STI physical macros described in the Capowski patent.

The transport macros generally align data bits with the clock, but cannot interpret what the data bits mean. At power up, the transport macros have not been initialized, thus, it is very possible that the data is not sampled in the proper manner. Therefore, the data transitions from the transport macros cannot be relied on. For example, there may be random oscillations, instead of a clean transition. The initialization state machines 24 and 34 have the ability to initiate synchronization, understand when synchronization is complete, and take action if an error occurs.

Normal operation state machines 22 and 32 control normal communications over link 16 after the link is initialized. More specifically, the normal operation state machines decode data packets. For example, for switch elements in the system, the normal operation state machine decodes a data packet header to determine where to route the packet, and generally handles error recovery for the link. As another example, for communication adapters, the normal operation state machine builds data packets and sends them out over the link. An extensive understanding of the operation of the normal operation state machines is not necessary for an understanding of the present invention.

A description of the different communication signals within sender 12 will now be given. Normal operation state machine 22 sends data to outbound transport macro 28 over line 42, and initialization state machine 24 sends data to macro 28 over lines 25 and 42. The initialization state machine 24 sends an "initialization done" signal to the normal operation state machine over line 44. The normal operation state machine sends a re-initialization request (or command) to initialization state machine 24 over line 46. Inbound transport macro 30 forwards a receiver synchronization complete code received over line 20 to the initialization state machine 24 and normal operation state machine 22 over line 48. The initialization state machine sends a "retime" request to inbound transport macro 30 over line 52, and macro 30 sends such a request to normal operation state machine 22 over line 50. Finally, an "interface active" signal is sent from inbound transport macro 30 to the initialization state machine over line 54. It will be understood that similar communications take place between the state machines and transport macros of receiver element 14. A description of the signals and the overall interaction between the sender element and receiver element will become clear from the following discussion.

Initially, either the sender or receiver sends a SYNCHRONIZATION$_{13}$ REQUEST to the other. For example, on start up, the first one to send such a request over lines 18 and 20 would be whichever one powers up first. In the present exemplary embodiment, the SYNCHRONIZATION$_{13}$ REQUEST comprises at least 32 clock cycles of logical zeros. However, it will be understood that a different number of clock cycles could be used. After both the sender and receiver have sent and received their respective SYNCHRONIZATION REQUESTs, the receiver begins sending a SLUG to the slave. As used herein, the term "slug" refers to an oscillation-free data segment received over a plurality of clock cycles. In the present exemplary embodiment, the oscillation-free data segment lasts for at least 16 clock cycles, though it could be more or less in a given system. The reason for the SLUG is that data out of the transport macros cannot be relied on before synchronization thereof. At this time, the receiver starts a time-out counter (part of initialization state machine 34) for a responsive SLUG from the sender. If the responsive SLUG has not been received before the time-out, the process begins again with synchronization requests. The same is true if the responsive SLUG is received, but is invalid (e.g., it includes an oscillation). For both sender 12 and receiver 14 in the present exemplary embodiment, when the first transition on the incoming line is detected, the first 8 cycles are ignored, due to possible transient oscillations from the link transport macro.

Figure 5:
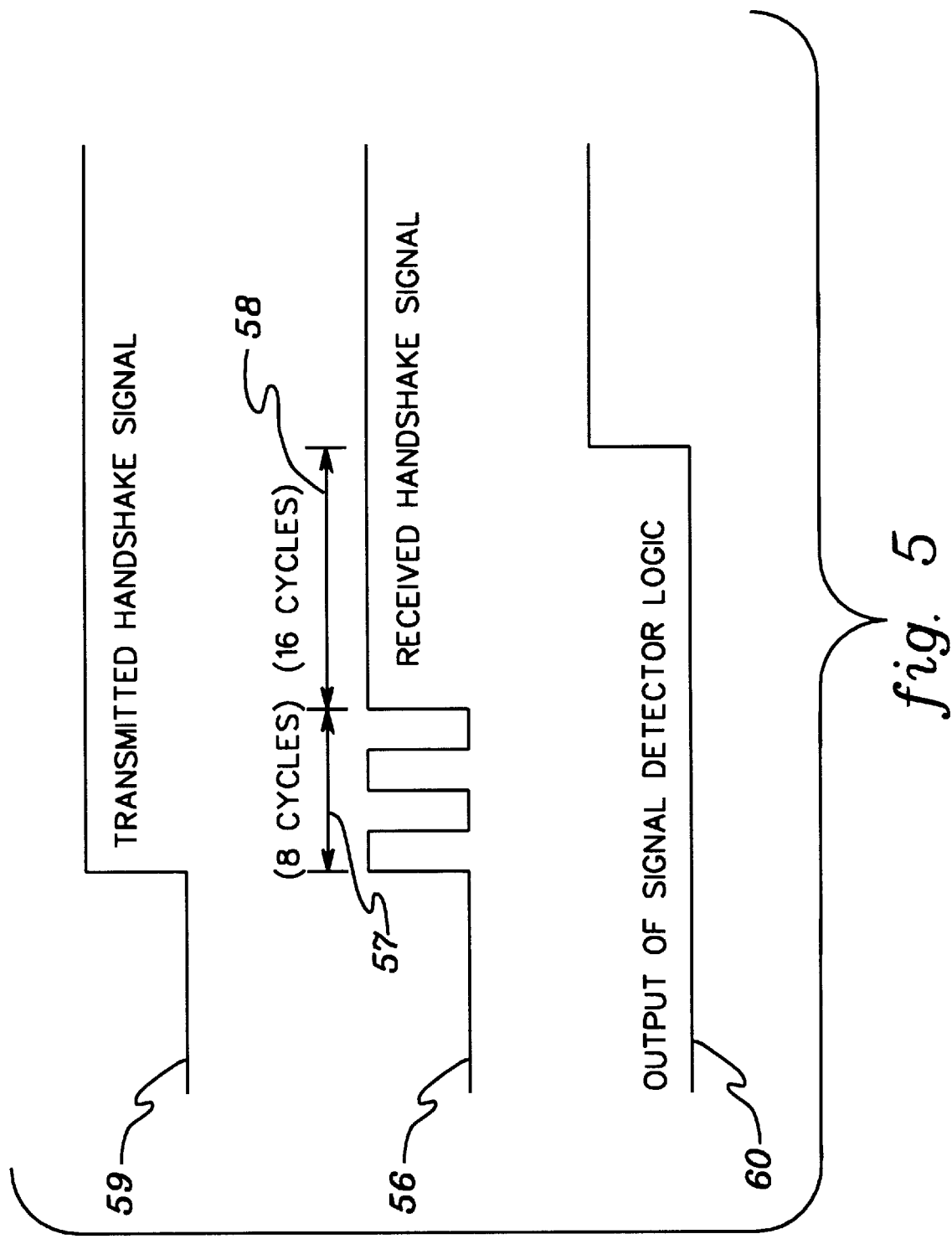
FIG. 5 is a timing diagram for a slug according to the present invention.

FIG. 5 is a timing diagram for a SLUG signal 56. As shown in FIG. 5, the first portion 57 of the SLUG (here, 8 cycles) is ignored, and the second portion 58, comprising 16 cycles of a clean transition from a logical zero to a logical 1, is the portion the sender and receiver are looking for. Signal 59 is an exemplary signal for what is actually attempted to be sent, but what is corrupted somewhat by the link transport macro, due to the fact that it has not yet been initialized, i.e., phase alignment is not complete. Signal detector logic (not shown) in initialization state machines 24 and 34 detects a signal 60 from the actual SLUG 56 at the end of the clean transition portion.

In this particular exemplary system, there was no way after 8 cycles that the oscillations could continue to occur. However, in other systems, there may be more or less oscillations. When both the sender and receiver have obtained a proper SLUG, each sends a RETIME$_{13}$ REQUEST from the corresponding initialization state machine to its link transport macro, instructing the macro to begin its own synchronization process. However, the link transport macros require a synchronization code in order to complete the process; thus, each initialization state machine sends such a code to its corresponding outbound link macro. When the link transport macros have finished their initialization, each sends an INTERFACE$_{13}$ ACTIVE signal to its respective initialization state machine. In the present exemplary embodiment, the sender's link transport macro begins initializing first, so that when the receiver receives its INTERFACE$_{13}$ ACTIVE signal, it can be assumed that the sender has already received its INTERFACE$_{13}$ ACTIVE signal. After the link transport macros have been initialized, the receiver sends a receiver synchronization complete code (SYNCH$_{13}$ COMPLETE) over line 20 to sender 12. In response, sender 12 sends a sender synchronization complete code (SYNCH$_{13}$ COMPLETE) to receiver 14 over line 18, thereby completing the link synchronization process. At this point, each initialization state machine signifies to its corresponding normal operation state machine that initialization is complete (over lines 44 and 83, respectively), the initialization state machines are idled, and the normal operation state machines assume control of the link.

During normal operation, however, it may be necessary or desirable to reinitialize the link. For example, when relative phase shifting of data or clock signals takes place. When one of the inbound transport macros sends a RETIME$_{13}$ REQUEST to its respective normal operation state machine, the normal operation state machine decides whether to honor it. If so, normal operation state machine 22, for example, sends a REINITIALIZE$_{13}$ REQUEST to initialization state machine 24 over line 46. As another example, reinitializing may be desirable when the bit error rate gets high, which could be detected by either the normal operation state machine or the inbound macro itself (see the discussion of FIG. 4 in the Capowski patent).

Figure 3:
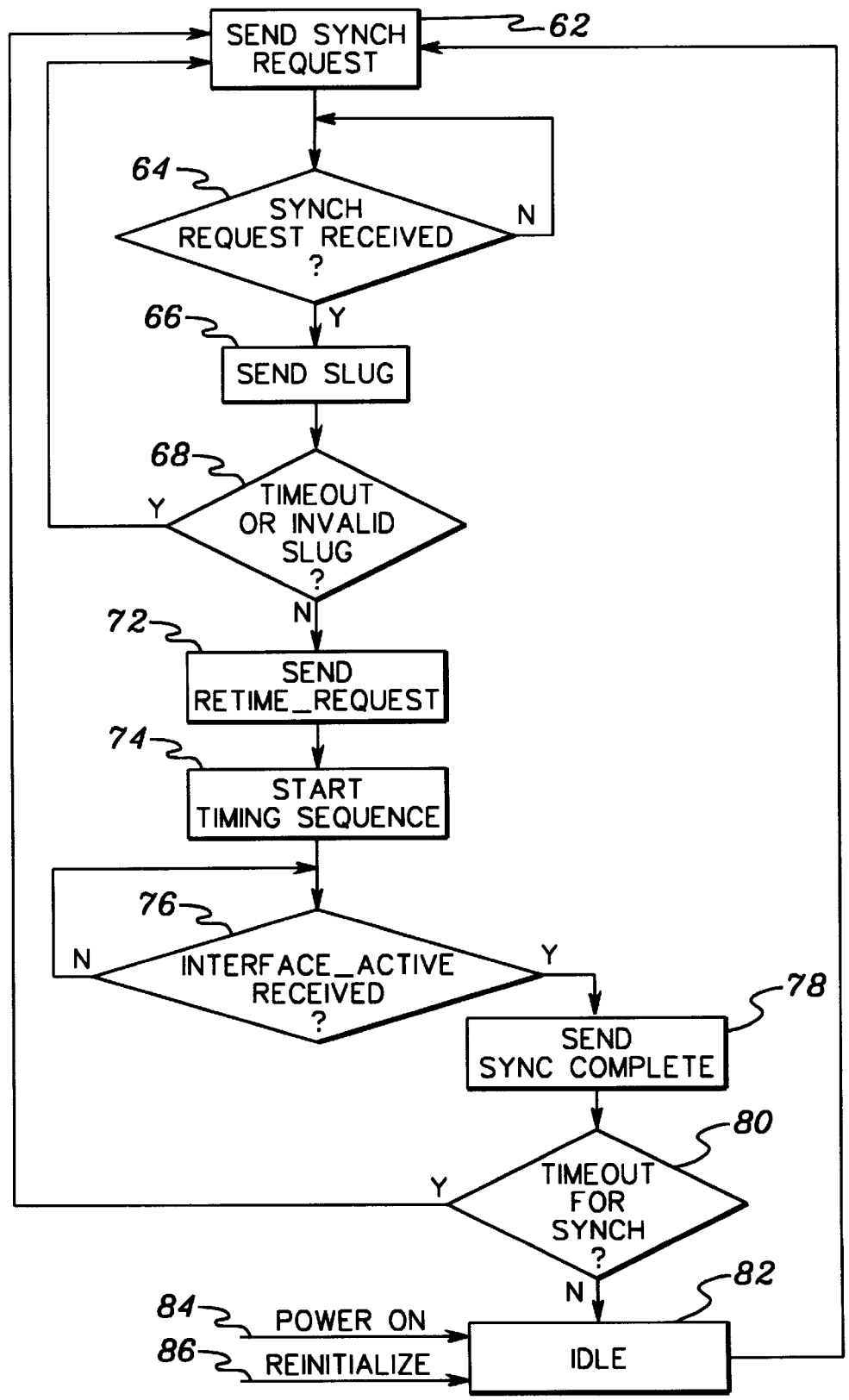
FIG. 3 is a flow diagram for the operation of the receiver element in FIG. 1.

FIG. 3 is a flow diagram for the operation of initialization state machine 34 in receiver 14. Initially, as indicated above, a SYNCHRONIZATION$_{13}$ REQUEST is sent to sender 12 over line 20 (Step 62, "SEND SYNCH REQUEST"). While sending the request, the receiver waits for a corresponding SYNCHRONIZATION$_{13}$ REQUEST from the sender (Inquiry 64, "SYNCH REQUEST RECEIVED?"). After receiving the corresponding request, the receiver sends a SLUG to the sender (Step 66 "SEND SLUG"). At the same time, the receiver starts a time-out counter (not shown) for receipt of the corresponding SLUG from the sender. If the SLUG has not been received from the sender within the time out period, initialization state machine 34 returns to step 62.

In parallel with the slug-receipt counter, when the first transition is received from sender 12, the receiver confirms its validity, i.e., ignores the first 8 cycles of data and then looks for 16 cycles of a clean transition (Inquiry 68, "TIMEOUT OR INVALID SLUG?"). If the SLUG is invalid, step 62 is returned to. After receiving a valid SLUG before timing out, the initialization state machine 34 sends a RETIME$_{13}$ REQUEST to inbound macro 38 of link transport macro 36 over line 73. This causes link transport macro 36 to begin its own initialization process. However, as mentioned above, the inbound macro needs a timing sequence in order to accomplish the initialization, which will come from sender 12. Similarly, inbound transport macro 30 needs a timing sequence from receiver 14. Initialization state machine 34 begins sending the required timing sequence to the sender via macro 40 over lines 70 and 20 (Step 74, "START TIMING SEQUENCE"). The timing sequences are described in the Halma et al. and Capowski et al. patents.

At this point, the receiver waits for a signal from the link transport macro indicating it has finished its initialization process (Inquiry 76, "INTERFACE$_{13}$ ACTIVE RECEIVED?"). After receiving the INTERFACE$_{13}$ ACTIVE signal, the receiver sends a SYNCH COMPLETE code to sender 12 over line 20, (Step 7, "SEND SYNCH$_{13}$ COMPLETE"). The receiver then starts a timeout counter (not shown) in initialization state machine 34 for receipt of a corresponding SYNCH COMPLETE from the sender, indicating that initialization is complete (Inquiry 80, "TIMEOUT FOR SYNCH?"). If the SYNCH$_{13}$ COMPLETE is not received from the sender within the timeout period, initialization state machine 34 returns to step 62. Otherwise, receiver 14 enters an idle state and sends an initialization done signal over line 83 to normal operation state machine 32 (Step 82, "IDLE"). Receiver 14 can be taken out of the idle state by, for example, either an initial power on of the computer system in which it is a part of, or by receiving a REINITIALIZE$_{13}$ REQUEST (or command) from its associated normal operation state machine 32, over line 86.

Figure 4:
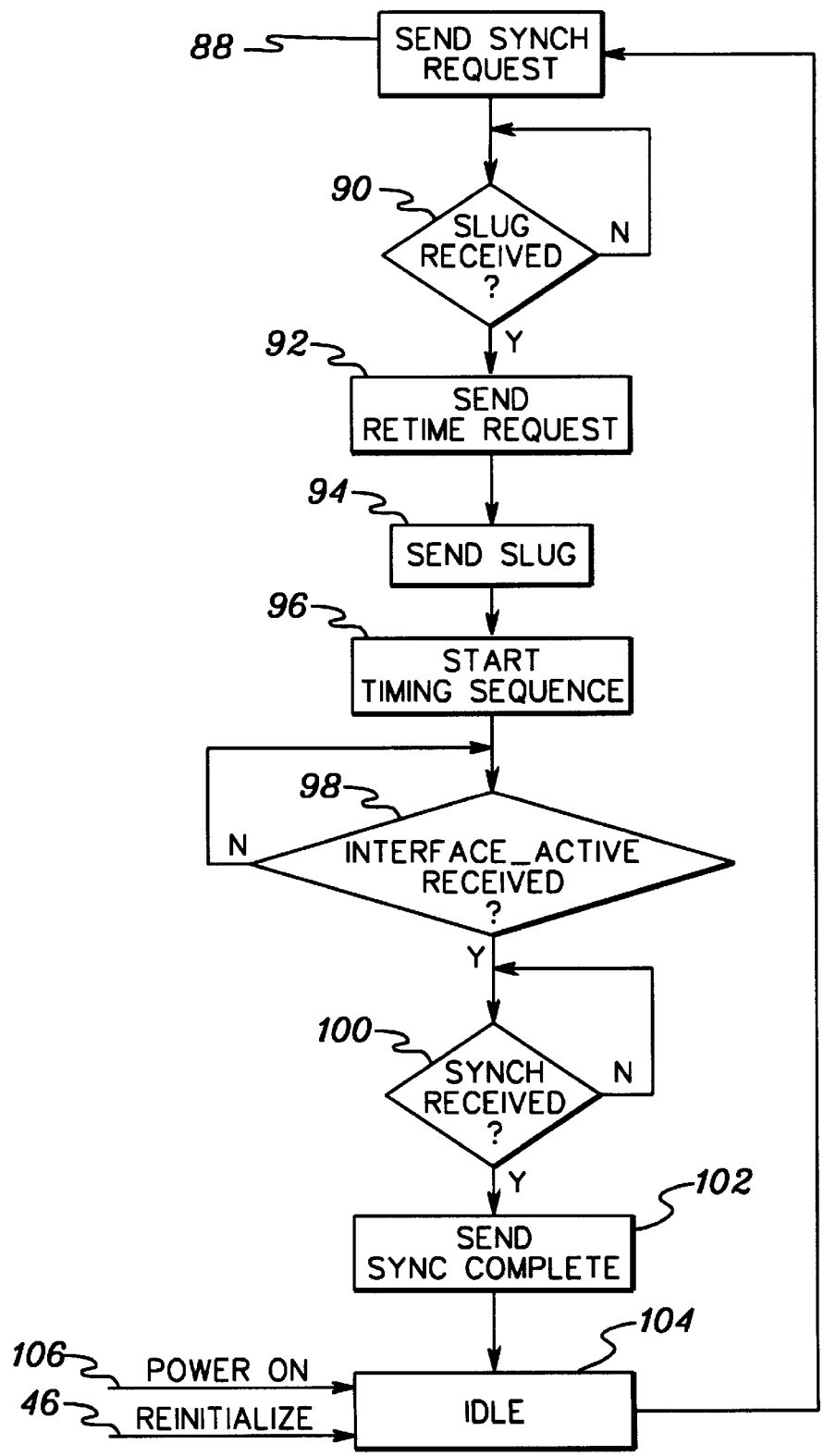
FIG. 4 is a flow diagram for the operation of the sender element in FIG. 1.
Figure 6:
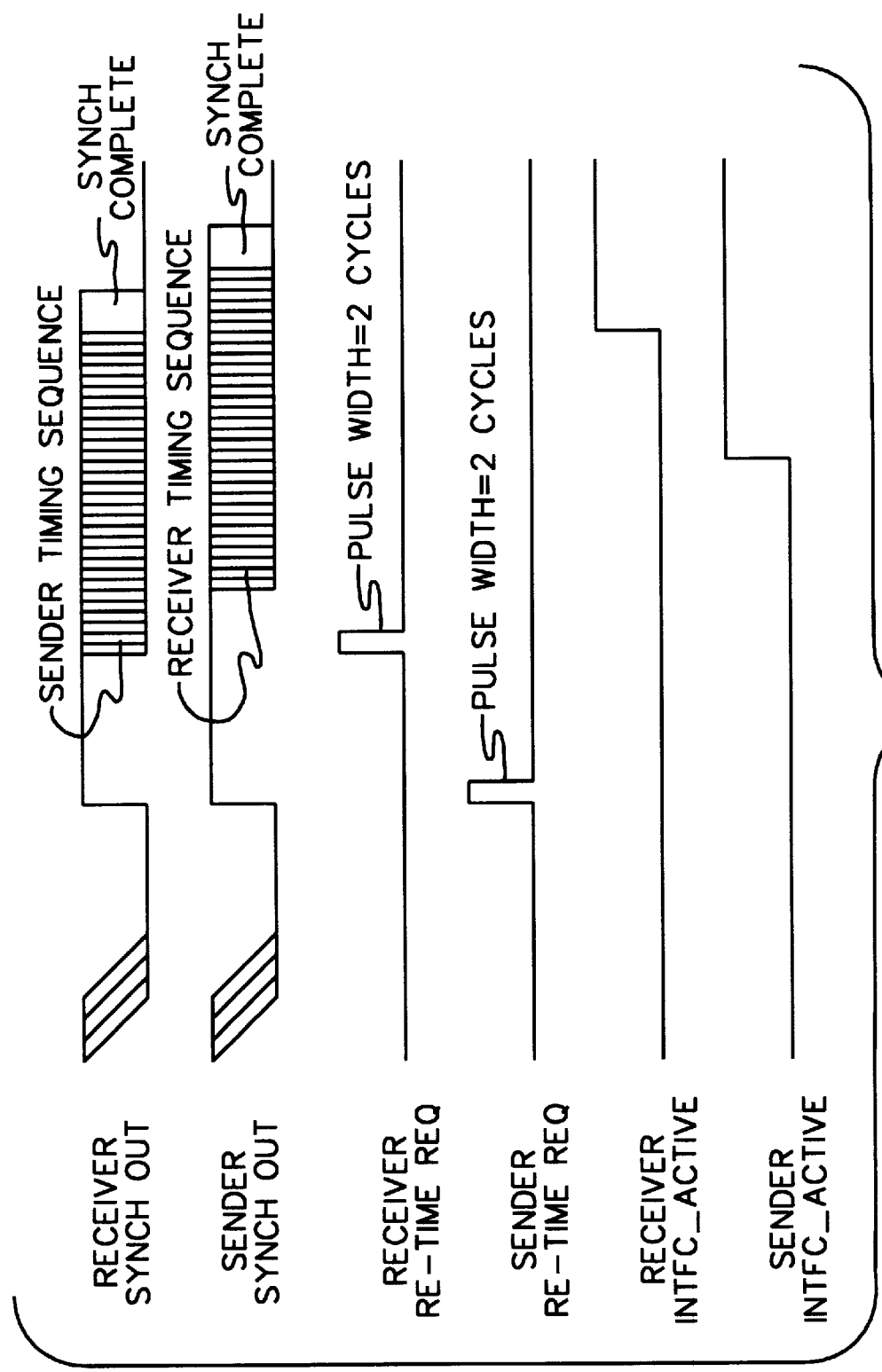
FIG. 6 is a timing diagram for the initialization protocol of the present invention.

FIG. 4 is a flow diagram for the operation of initialization state machine 24 in sender 12. As with the receiver, the sender first sends a SYNCHRONIZATION$_{13}$ REQUEST to receiver 14 over line 18 (Step 88, "SEND SYNCH REQUEST"). The sender then waits for the SLUG to be received from the receiver (Inquiry 90, "SLUG RECEIVED?"). After receiving the SLUG from the receiver, initialization state machine 24 sends a RETINE$_{13}$ REQUEST to inbound transport macro 30 over line 52, causing link transport macro 26 to begin its initialization process (step 92, "SEND RETIME REQUEST"). Thereafter, sender 12 sends a SLUG to receiver 14 over line 18 (Step 94, "SEND SLUG"). Recall that inbound macro 30, like inbound macro 38, requires a timing sequence to complete initialization. The required timing sequence arrives from receiver 14 over line 20. Initialization state machine 24 then begins sending the timing sequence required by inbound macro 38 to outbound transport macro 28 over lines 25 and 42 (Step 96, "START TIMING SEQUENCE"). The timing sequences are described in the Halma et al. and Capowski et al. patents. Initialization state machine 24 then waits for the INTERFACE ACTIVE signal from inbound transport macro 30 over line 54 (Inquiry 98, "INTERFACE$_{13}$ ACTIVE RECEIVED?"). After receiving the INTERFACE$_{13}$ ACTIVE signal, the sender must wait for the SYNCH-COMPLETE code from receiver 14 over line 20, indicating that receiver 14 has finished its portion of the initialization process (Inquiry 100, "SYNCH RECEIVED?"). After receiving the SYNCH$_{13}$ COMPLETE, initialization state machine 24 responds with its own SYNCH$_{13}$ COMPLETE code over lines 25, 42 and 18 (Step 102, "SEND SYNCH$_{13}$ COMPLETE"). At this point, the initialization process is complete, and initialization state machine 24 indicates that to the normal operation state machine 22 over line 44 and enters an idle state, returning control to the normal operation state machine (Step 104, "IDLE"). As with the receiver, the sender can be taken out of the idle state by either turning on the system 106 or a reinitialize request (or command) from normal operation state machine 22 over line 46. FIG. 6 is a timing diagram for the operation of initialization state machines 24 and 34 in synchronization unit 10 of FIG. 2.

Since the sender's SYNCH$_{13}$ COMPLETE code is sent across line 18, a multi-bit line for data, tag and clock, it is advantageously used to convey more information than just synchronization being complete. The sender's SYNCH$_{13}$ COMPLETE code to the receiver is also used to pass a link operation parameter to the receiver's normal operation state machine. The link operation parameter is set by a higher level of control (e.g., system configuration software) to establish values that both of the normal operation state machines must use in order for the link to operate properly after initializing. For example, the link operation parameter could dictate the interval in cycles at which sender 12 will transmit an error detection code across line 18 to receiver 14. In this way, the link operation parameter is propagated through the system over the actual link that it is meant to control. No extra system configuration interfaces are required.

FIG. 2 shows sender 12 with link operation parameter register 110. Similarly, receiver 14 includes link operation parameter register 112. Register 110 is referenced by both normal operation state machine 22 and initialization state machine 24, with the link operation parameter being sent across line 18 to receiver 14 as part of the SYNCH$_{13}$ COMPLETE code. Link operation parameter register 112 is set by initialization state machine 34 on receipt of the sender's SYNCH$_{13}$ COMPLETE code, and referenced by normal operation state machine 32.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method for initializing a self-timed link between a first element and a second element in a data processing system, comprising the steps of:

either one of the first element and the second element requesting to begin initializing;

the first element determining whether the second element is ready to begin initializing the self-timed link;

the second element determining whether the first element is ready to begin initializing the self-timed link; and forcing an order for the initializing.

2. The method of claim 1, further comprising steps of:

the first element determining whether the self-timed link is initialized; and the second element determining whether the self-timed link is initialized.

3. The method of claim 1, wherein the first element comprises a first state machine for initialization and a first macro for link transport, wherein the second element comprises a second state machine for initialization and a second macro for link transport, and wherein the first and second determining steps are performed by the first state machine and the second state machine, respectively.

4. The method of claim 3, wherein the first step of determining comprises the second state machine sending a first slug to the first state machine over the link, wherein the second step of determining comprises the first state machine sending a second slug to the second state machine over the link, and wherein each of the first slug and the second slug comprises an oscillation-free data segment.

5. The method of claim 4, wherein the data processing system includes a clock, and wherein the oscillation-free data segment comprises a single transition between a logical zero and a logical one over a plurality of cycles of the clock.

6. The method of claim 4, further comprising a step of restarting the initializing method if at least one of the first slug and second slug fails to be received within a predetermined time.

7. The method of claim 3, further comprising steps of:

the first state machine causing the first macro to begin initializing; and the second state machine causing the second macro to begin initializing.

8. The method of claim 7, further comprising steps of:

the first state machine indicating to the second state machine that initialization is complete in response to the first macro indicating to the first state machine that initialization is complete; and the second state machine indicating to the first state machine that initialization is complete in response to the second macro indicating to the second state machine that initialization is complete.

9. The method of claim 8, further comprising a step of idling the first state machine and the second state machine after each has indicated to the other that initialization is complete.

10. The method of claim 9, further comprising a step of re-initializing, after the step of idling, in response to a reinitialize command.

11. The method of claim 8, wherein the second element further comprises a normal operation state machine for post-initialization link control, and wherein the first step of indicating comprises the first state machine sending a link operation parameter to the normal operation state machine of the second element contemporaneously with the indication of initialization complete.

12. The method of claim 7, wherein each of the first macro and second macro comprises an inbound transport macro and an outbound transport macro, wherein the first step of causing comprises the second state machine sending a first timing sequence to the inbound transport macro of the first macro, and wherein the second step of causing comprises the first state machine sending a second timing sequence to the inbound transport macro of the second macro.

13. The method of claim 12, wherein the step of sending the first timing sequence is begun prior to the step of sending the second timing sequence.

14. The method of claim 1, wherein the first step of determining comprises the second element sending an initialization request to the first element over the link, and wherein the second step of determining comprises the first element sending an initialization request to the second element over the link.

15. The method of claim 1, wherein the first step of determining comprises the second element sending a first slug to the first element over the link, wherein the second step of determining comprises the first element sending a second slug to the second element over the link, and wherein each of the first slug and the second slug comprises an oscillation-free data segment.

16. The method of claim 15, wherein the data processing system includes a clock, and wherein the oscillation-free data segment comprises a single transition between a logical zero and a logical one over a plurality of cycles of the clock.

17. The method of claim 15, further comprising a step of restarting the initializing if at least one of the first slug and second slug fails to be received within a predetermined time.

18. The method of claim 1, wherein each of the steps of determining comprises automatically determining in response to turning on the data processing system.

19. A method for initializing a self-timed link between a first element and a second element in a data processing system, comprising the steps of:
  the first element determining whether the second element is ready to begin initializing the self-timed link;
  the second element determining whether the first element is ready to begin initializing the self-timed link; and
  wherein the first element comprises a first state machine for initialization and a first macro for link transport, wherein the second element comprises a second state machine for initialization and a second macro for link transport, and wherein the first and second determining steps are performed by the first state machine and the second state machine, respectively.

20. The method of claim 19, wherein the first step of determining comprises the second state machine sending a first slug to the first state machine over the link, wherein the second step of determining comprises the first state machine sending a second slug to the second state machine over the link, and wherein each of the first slug and the second slug comprises an oscillation-free data segment.

21. The method of claim 20, wherein the data processing system includes a clock, and wherein the oscillation-free data segment comprises a single transition between a logical zero and a logical one over a plurality of cycles of the clock.

22. The method of claim 20, further comprising a step of restarting the initializing method if at least one of the first slug and second slug fails to be received within a predetermined time.

23. The method of claim 19, further comprising steps of:
  the first state machine causing the first macro to begin initializing; and
  the second state machine causing the second macro to begin initializing.

24. The method of claim 23, further comprising steps of:
  the first state machine indicating to the second state machine that initialization is complete in response to the first macro indicating to the first state machine that initialization is complete; and
  the second state machine indicating to the first state machine that initialization is complete in response to the second macro indicating to the second state machine that initialization is complete.

25. The method of claim 24, further comprising a step of idling the first state machine and the second state machine after each has indicated to the other that initialization is complete.

26. The method of claim 25, further comprising a step of re-initializing, after the step of idling, in response to a reinitialize command.

27. The method of claim 24, wherein the second element further comprises a normal operation state machine for post-initialization link control, and wherein the first step of indicating comprises the first state machine sending a link operation parameter to the normal operation state machine of the second element contemporaneously with the indication of initialization complete.

28. The method of claim 23, wherein each of the first macro and second macro comprises an inbound transport macro and an outbound transport macro, wherein the first step of causing comprises the second state machine sending a first timing sequence to the inbound transport macro of the first macro, and wherein the second step of causing comprises the first state machine sending a second timing sequence to the inbound transport macro of the second macro.

29. The method of claim 28, wherein the step of sending the first timing sequence is begun prior to the step of sending the second timing sequence.

30. A method for initializing a self-timed link between a first element and a second element in a data processing system, comprising the steps of:
  the first element determining whether the second element is ready to begin initializing the self-timed link;
  the second element determining whether the first element is ready to begin initializing the self-timed link; and
  wherein the first step of determining comprises the second element sending an initialization request to the first element over the link, and wherein the second step of determining comprises the first element sending an initialization request to the second element over the link.

31. A method for initializing a self-timed link between a first element and a second element in a data processing system, comprising the steps of:

the first element determining whether the second element is ready to begin initializing the self-timed link;

the second element determining whether the first element is ready to begin initializing the self-timed link; and wherein the first step of determining comprises the second element sending a first slug to the first element over the link, wherein the second step of determining comprises the first element sending a second slug to the second element over the link, and wherein each of the first slug and the second slug comprises an oscillation-free data segment.

32. The method of claim 31, wherein the data processing system includes a clock, and wherein the oscillation-free data segment comprises a single transition between a logical zero and a logical one over a plurality of cycles of the clock.

33. The method of claim 31, further comprising a step of restarting the initializing if at least one of the first slug and second slug fails to be received within a predetermined time.

34. A method for initializing a self-timed link between a first element and a second element in a data processing system, comprising the steps of:

the first element determining whether the second element is ready to begin initializing the self-timed link;

the second element determining whether the first element is ready to begin initializing the self-timed link; and wherein each of the steps of determining comprises automatically determining in response to turning on the data processing system.

\* \* \* \* \*

UNITED STATES PATENT AND TRADEMARK OFFICE
CERTIFICATE OF CORRECTION

PATENT NO. : 5,968,179

DATED : October 19, 1999

INVENTOR(S) : Barkey et al.

It is certified that error appears in the above-identified patent and that said Letters Patent are hereby corrected as shown below:

Col. 3, line 8, delete "NIZATION$_{13}$REQUEST" and replace with --NIZATION_REQUEST--.

Col. 3, line 11, delete "SYNCHRONIZATION$_{13}$" and replace with --SYNCHRONIZATION_--.

Col. 3, line 16, delete "NIZATION REQUESTs" and replace with --NIZATION_REQUESTs--.

Col. 3, line 50, delete "RETIME$_{13}$" and replace with --RETIME_--.

Col. 3, line 58, delete "INTERFACE$_{13}$ACTIVE" and replace with --INTERFACE_ACTIVE--.

Col. 3, line 62, delete "INTERFACE$_{13}$ACTIVE" and replace with --INTERFACE_ACTIVE--.

Col. 3, line 63, delete "INTERFACE$_{13}$ACTIVE" and replace with --INTERFACE_ACTIVE--.

Col. 3, line 66, delete "(SYNCH$_{13}$ COMPLETE)" and replace with --(SYNCH_COMPLETE)--.

Col. 4, line 1, delete "(SYNCH$_{13}$ COMPLETE)" and replace with --(SYNCH_COMPLETE)--.

Col. 4, line 11, delete "RETIME$_{13}$" and replace with --RETIME_--.

Col. 4, line 15, delete "REINITIALIZE$_{13}$REQUEST" and replace with --REINITIALIZE_REQUEST--.

UNITED STATES PATENT AND TRADEMARK OFFICE
CERTIFICATE OF CORRECTION

PATENT NO. : 5,968,179
DATED : October 19, 1999
INVENTOR(S) : Barkey et al.

It is certified that error appears in the above-identified patent and that said Letters Patent are hereby corrected as shown below:

Col. 4, line 23, delete "SYNCHRONIZATION$_{13}$REQUEST" and replace with --SYNCHRONIZATION_REQUEST--.

Col. 4, line 26, delete "SYNCHRONIZATION$_{13}$REQUEST" and replace with --SYNCHRONIZATION_REQUEST--.

Col. 4, line 41, delete "RETIME$_{13}$REQUEST" and replace with --RETIME_REQUEST--.

Col. 4, line 55, delete "INTERFACE$_{13}$ACTIVE" and replace with --INTERFACE_ACTIVE--.

Col. 4, line 56, delete "INTERFACE$_{13}$" and replace with --INTERFACE_--.

Col. 4, line 58, delete "SYNCH$_{13}$" and replace with --SYNCH_--.

Col. 4, line 61, delete "SYNCH   COMPLETE" and replace with --SYNCH_COMPLETE--.

Col. 4, line 63, delete "SYNCH$_{13}$COMPLETE" and replace with --SYNCH_COMPLETE--.

Col. 5, line 4, delete "REINITIALIZE$_{13}$REQUEST" and replace with --REINITIALIZE_REQUEST--.

Col. 5, line 8, delete "SYNCHRONIZATION$_{13}$REQUEST" and replace with --SYNCHRONIZATION_REQUEST--.

UNITED STATES PATENT AND TRADEMARK OFFICE
CERTIFICATE OF CORRECTION

PATENT NO. : 5,968,179
DATED : October 19, 1999
INVENTOR(S) : Barkey et al.

It is certified that error appears in the above-identified patent and that said Letters Patent are hereby corrected as shown below:

Col. 5, line 13, delete "RETINE$_{13}$" and replace with --RETIME_--.

Col. 5, line 29, delete "INTERFACE$_{13}$ACTIVE" and replace with --INTERFACE_ACTIVE--.

Col. 5, line 30, delete "INTERFACE$_{13}$ACTIVE" and replace with --INTERFACE_ACTIVE--.

Col. 5, line 34, delete "SYNCH$_{13}$" and replace with --SYNCH_--.

Col. 5, line 36, delete "SYNCH$_{13}$COMPLETE" and replace with --SYNCH_COMPLETE--.

Col. 5, line 37, delete "SYNCH$_{13}$COMPLETE" and replace with --SYNCH_COMPLETE--.

Col. 5, line 48, delete "SYNCH$_{13}$COMPLETE" and replace with --SYNCH_COMPLETE--.

Col. 5, line 51, delete "SYNCH$_{13}$" and replace with --SYNCH_--.

Col. 6, line 3, delete "SYNCH$_{13}$" and replace with --SYNCH_--.

Col. 6, line 6, delete "SYNCH$_{13}$COMPLETE" and replace with --SYNCH_COMPLETE--.

UNITED STATES PATENT AND TRADEMARK OFFICE
CERTIFICATE OF CORRECTION

PATENT NO. : 5,968,179
DATED : October 19, 1999
INVENTOR(S) : Barkey et al.

It is certified that error appears in the above-identified patent and that said Letters Patent is hereby corrected as shown below:

Col. 6, line 6, delete "SYNCH$_{13}$COMPLETE" and replace with --SYNCH_COMPLETE--.

Signed and Sealed this

Twenty-first Day of November, 2000

Attest:

Q. TODD DICKINSON

Attesting Officer      Director of Patents and Trademarks